Aug. 17, 1926.
G. B. LIVINGSTON
TONGS
Filed Dec. 23, 1924
1,596,497
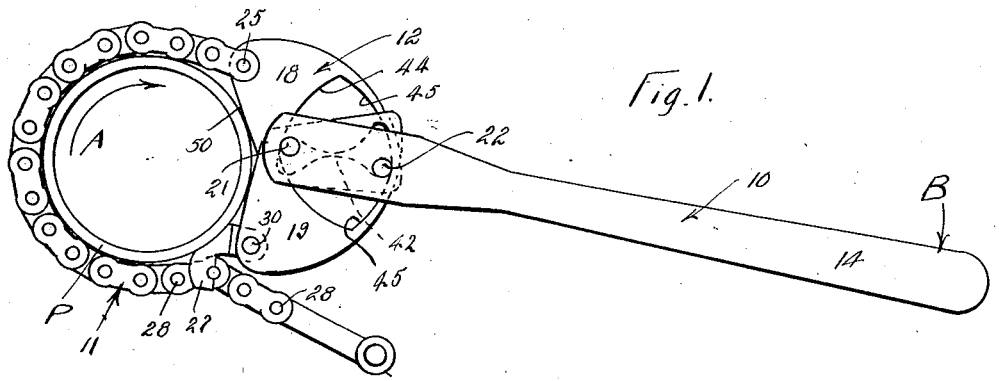
Fig. 1.
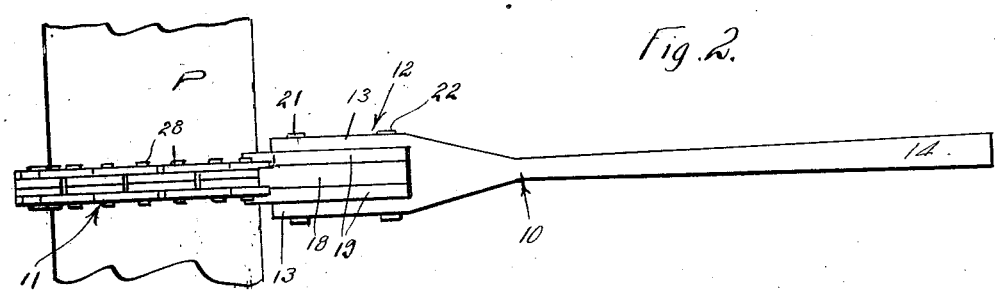
Fig. 2.
Fig. 3.
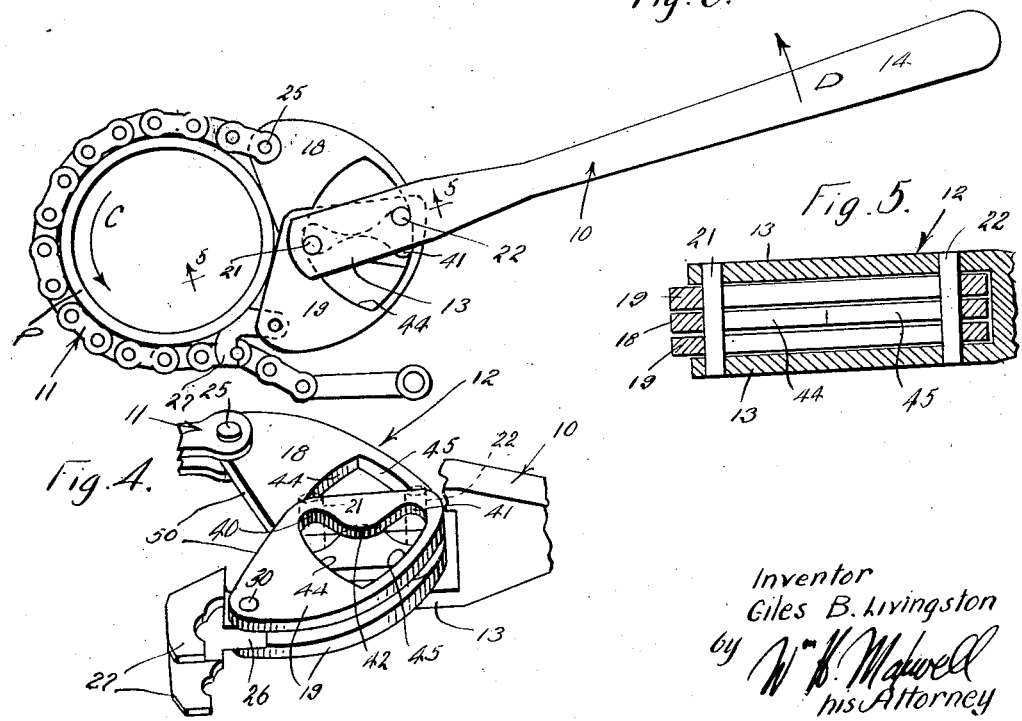
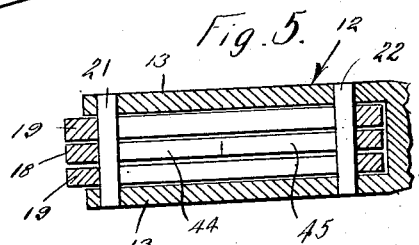
Fig. 5.
Fig. 4.
Inventor
Giles B. Livingston
by W. K. Maxwell
his Attorney Patented Aug. 17, 1926.

1,596,497

UNITED STATES PATENT OFFICE.

GILES B. LIVINGSTON, OF SOUTHGATE, CALIFORNIA.

TONGS.

Application filed December 23, 1924. Serial No. 757,623.

This invention relates to tongs and it is an object of the invention to provide a simple practical and improved tool of this character.

Tongs usually employed to handle pipes, casings, etc. are more or less inconvenient to handle and when applied to an object are operable to turn the object in one direction only. When operating such a tool it is necessary to remove it from the object and turn it around or over, if it is desired to reverse rotation of the object.

It is an object of this invention to provide an improved tong operable in either direction when applied to an object.

Another object of this invention is to provide tongs of the character herein set forth operable to engage an object uniformly and without tendency to crush it at any one point.

A further object of this invention is to provide a tool of the character set forth which is simple and inexpensive of construction and simple and convenient to operate.

The various objects and features of my invention will be best and more fully understood from the following detailed description of a typical form of the invention throughout which description reference is had to the accompanying drawings in which—

Fig. 1 is a plan view of tongs embodying the present invention showing the tongs applied to an object and in position to turn the object in one direction.

Fig. 2 is a side elevation of the tongs showing it applied to an object.

Fig. 3 is a view similar to Fig. 1 showing the tongs in position to rotate the object in the other direction.

Fig. 4 is a perspective view of a portion of the tongs, certain parts being broken away, and Fig. 5 is an enlarged detailed sectional view taken as indicated by line 5—5 on Fig. 3.

My present invention is in its broader aspects applicable to tongs of various constructions. It is particularly suited, however, for use in tongs such as are known as chain tongs, so therefore, I have in this disclosure set forth the invention in a form suitable for and as applied to a chain tongs. It will be apparent from the following description that the invention might be advantageously carried out with an element other than a chain, so therefore, when I use the term chain it is to be understood to include a chain or any element or device that may be broadly an equivalent thereof.

My improved tongs comprises, generally, a lever 10, an object engaging element 11, and means 12 connecting the element 11 with the lever 10 whereby the element is operated to grip an object upon actuation of the lever.

The lever 10 may be formed and proportioned in much the same manner as the lever of an ordinary tongs. The inner end of the lever is yoked to form two spaced side parts 13 while the outer end of the lever is shaped and proportioned to form a handle 14.

The object engaging element 11 is adapted to engage around the object to be operated by the tongs and may be in the form of a chain as shown in the drawings. The particular chain shown in the drawings is of the type usually employed in chain tongs. It will be obvious that the object engaging element might be in forms other than that of a chain, for instance, it might comprise a plurality of pivotally connected jaw-like members.

The means 12 provided by this invention comprises plates or jaws 18 and 19 connected with the ends of the chain 11 and with the lever 10. The jaws 18 and 19 overlap and are arranged in the yoked end of the lever, that is, between the side parts 13. The plates are retained in position with relation to the yoked end of the lever by means of two spaced pins 21 and 22 and extend between the side parts 13 and through registering openings in the jaws. For the purpose of balance, I prefer to provide one jaw 18 and two jaws 19 and to arrange the jaws so that the jaw 18 extends between the two jaws 19 as I have shown throughout the drawings. It is desirable in practice to permanently connect one end of the chain 11 with the means 12 and to releasably connect the other end of the chain with the means 12. In the drawings I have shown an arrangement wherein one end of the chain 11 is permanently pivotally connected by means of a pin 25 with the outer end of the jaw 18 while the other end of the chain is adapted to be adjustably releasably connected with the outer ends of the jaws 19. The particular form of releasable connection shown in the drawings comprises a hook member having a part 26 extending between the outer ends of the jaws 19 and two spaced hook parts 27 adapted to receive the chain and to hold a pintle pin 28 of the chain in the manner illustrated in the drawings. The part 26 is connected to the jaws 19 by a pivot pin 30. It will be apparent from inspection of the drawings that the chain may be adjusted as to length to fit around an object by arranging various pintle pins of the chain in the hook parts 27.

The pins 21 and 22 which connect the jaws 18 and 19 with the lever are spaced apart longitudinally of the lever, the pin 21 being arranged between the outer end portions of the side parts 13 and the pin 21 being arranged between the inner end portions of the side parts 13. The jaws 18 and 19 may be alike in shape and proportioning, however, they are reversed as to arrangement so that they extend between the side parts 13 of the lever in opposite directions as clearly shown throughout the drawings. This arrangement causes the connections between the chain 11 and jaws to be at opposite sides of the lever. The jaws are provided with openings which pass the pins 21 and 22 so that the pins operate to retain the jaws in connection with the yoke and which provide the jaws with parts which cooperate with the pins so that the chain 11 is tightened onto an object upon operation of the lever in either direction. Although the invention might be carried out by providing each jaw with two openings one for the pin 21 and another for the pin 22 it is convenient in practice to provide each jaw with a single large opening, having parts for carrying both pins. In its preferred form the opening provided in each jaw is shaped so that it has corners or sockets 40 and 41 at the inner end portion of the jaws spaced to receive the pins 21 and 22, respectively. The inner end wall or side of the opening, that is, the side of the opening at the inner end of the jaw has a projecting part 42 which operates or extends between the sockets 40 and 41. Extending from the socket 40 the opening has a side wall 44 curved concentrically with the socket 41. A side wall 45 extends from the socket 41 and is curved concentrically with the socket 40. The sides 44 and 45 are extended until they join as clearly shown throughout the drawings.

From inspection of the drawings, particularly Fig. 4, it will be seen that the opening provided in each of the jaws is more or less heart-shaped. As before stated the openings in the jaws 18 and 19 are preferably arranged and proportioned the same, while the jaws 18 and 19 are oppositely arranged in the yoke, so that the various parts of the openings in the jaws 18 and 19 are oppositely disposed with relation to the pins 21 and 22.

In using the tong it is applied to an object, for instance, a pipe P in either direction, that is, without particular reference to the direction in which the pipe is to be turned. In applying the tong the chain is arranged around the object with the jaws 18 and 19 positioned so that the pins 21 and 22 are in the sockets 40 and 41. When it is desired to rotate the pipe P in the direction indicated by the arrow A in Fig. 1 the handle 14 of the lever is swung in the direction indicated by the arrow B in Fig. 1, so that the pin 21 bears in the sockets 40 of the jaws 19 and moves along the side wall 44 of the opening in the jaw 18 while the pin 22 bears in the socket 41 of the jaw 18 and moves along the side walls 45 of the openings in the jaws 19. This operation continues until the chain and gripping faces 50 of the jaws have tightly engaged the pipe so that the pipe is firmly gripped. Further movement of the handle 14 in the direction indicated by arrow B will cause the pipe P to be rotated in the direction indicated by the arrow A. If it is desired to rotate the pipe P in the direction indicated by arrow C in the Fig. 3 the handle portion of the lever may be swung in the direction indicated by the arrow D in Fig. 3 causing the pins 21 and 22 to operate on or in the jaws in a manner exactly opposite to that just described so that the pipe is gripped and thereafter turned in the direction indicated by the arrow C. It will thus be seen that the tong can be operated to turn the pipe in either direction without reversing it as to its position on or relation to the pipe and it will be apparent how the tong can be effectively operated to have a ratchet action on the pipe, if it is necessary to operate in a limited space. When it is desired to remove the tong a lever is positioned where the jaws are more or less free or unactuated whereupon the chain can be removed from the hook parts 27 allowing the tool to be removed from the pipe.

Having described only a typical preferred form of my invention I do not wish to limit myself to the specific details hereinabove set forth, but wish to reserve to myself any changes or variations that may appear to those skilled in the art or fall within the scope of the following claims.

Having described my invention, I claim:

1. Tongs including, a lever, a chain, and means connecting the chain with the lever so that the chain grips an object upon operation of the lever in either direction, said means including, two jaws having openings through them and arranged so that their openings register, one jaw connected with each end of the chain, and parts directly on the lever cooperatively engaging the openings in the jaws, said parts being spaced apart longitudinally of the lever.

2. Tongs including, a lever, a chain, and means connecting the chain with the lever so that the chain grips an object upon operation of the lever in either direction, said means including, two overlapping jaws connected with the chain and having oppositely disposed registering openings, and spaced pins carried by the lever cooperatively engaging the openings in the jaws.

3. Tongs including, a lever, a chain, and means connecting the chain with the lever so that the chain grips an object upon operation of the lever in either direction, said means including, two overlapping jaws connected with the chain and having oppositely disposed registering openings, spaced parts on the end of the lever between which the jaws operate, and two spaced pins carried by said parts of the lever and extending through the openings in the jaws.

4. Tongs including a lever yoked at its inner end, a chain, and means connecting the chain with the lever so that the chain grips an object upon operation of the lever in either direction, said means including two jaws connected with opposite ends of the chain, the jaws being arranged in the yoke of the lever and having oppositely disposed registering openings, and two spaced pins carried by the yoke and extending through the openings.

5. Tongs including, a lever, a chain, and means connecting the chain with the lever so that the chain grips an object upon operation of the lever in either direction, said means including, two overlapping jaws, having parts to directly engage an object placed in the tool, the jaws having oppositely disposed registering openings, and parts on the lever cooperatively connecting the lever and jaws by extending through the openings.

6. Tongs including, a lever, a chain, and means connecting the chain with the lever so that the chain grips an object upon operation of the lever in either direction, said means including, two overlapping jaws connected with opposite ends of the chain, the jaws having oppositely disposed registering openings, and two spaced members on the lever extending through the openings, the opening in each jaw having two spaced socket parts to receive said members, and parts joining the socket parts whereby the members are movable into and out of the socket parts.

7. Tongs including a lever, yoked in its inner end so that it has two spaced side parts, a chain, two jaws, one permanently connected with one end of the chain, the other releasably adjustably connected with the other end of the chain, the jaws being arranged to overlap and extend between the side parts of the lever, the jaws having oppositely disposed like registering openings, two pins extending between the side parts of the lever and through the openings of the jaws, said pins being spaced apart longitudinally of the lever, the opening in each jaw having two spaced socket parts at the inner end of the jaws to receive the pins, there being a part of the opening extending from the socket provided to receive the outermost pin curved concentrically with the socket provided to receive the innermost pin and there being a part of the opening extending from the socket provided to receive the innermost pin curved concentrically with the socket provided to receive the outermost pin.

In witness that I claim the foregoing I have hereunto subscribed my name this 5th day of Dec., 1924.

GILES B. LIVINGSTON.